May 23, 1950     R. KENNEDY     2,509,152
TOOL AND CUTTER HOLDER
Filed April 11, 1946     2 Sheets-Sheet 1
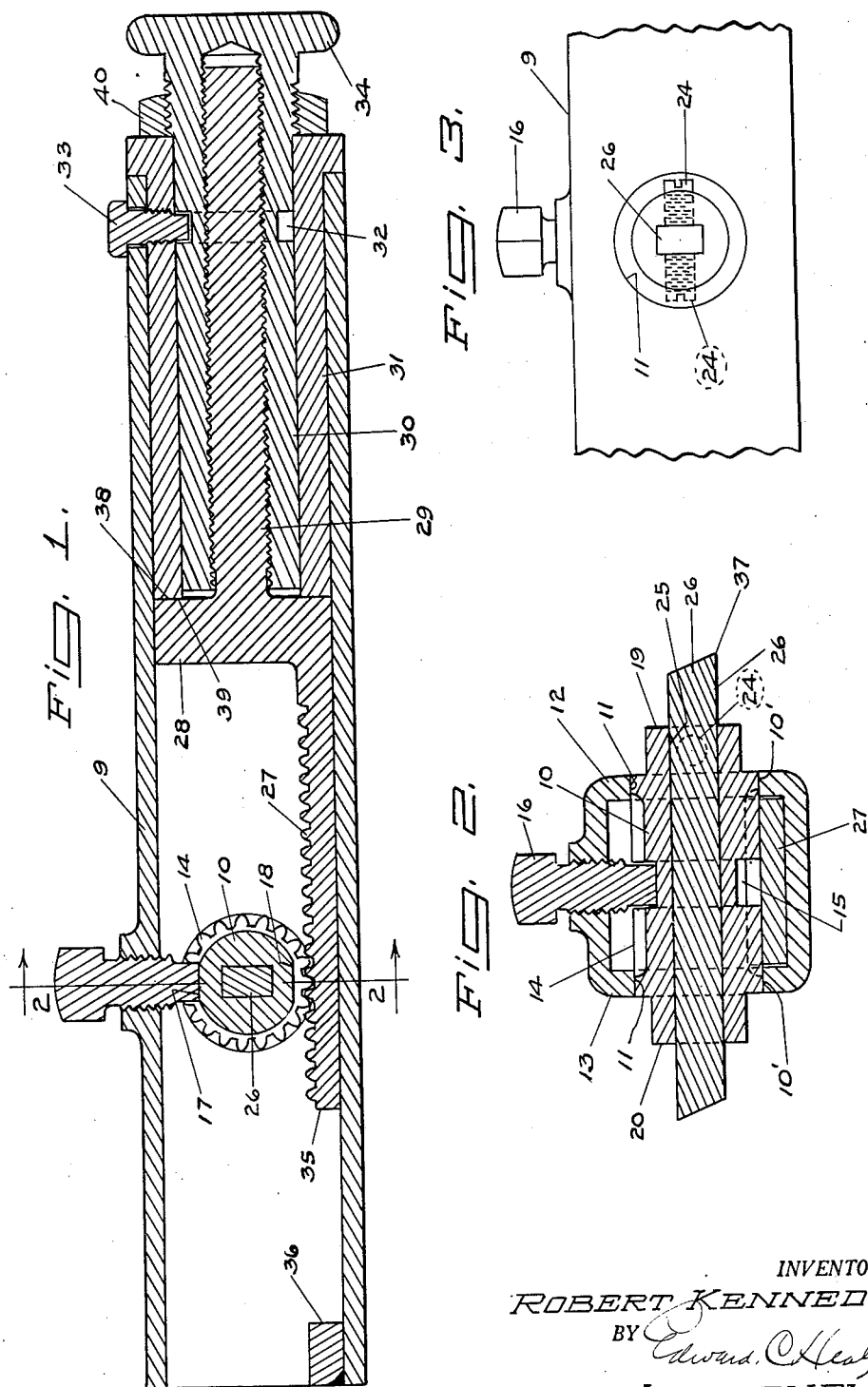
INVENTOR.
ROBERT KENNEDY
BY Edward C. Healy
ATTORNEY May 23, 1950  R. KENNEDY  2,509,152
TOOL AND CUTTER HOLDER
Filed April 11, 1946  2 Sheets-Sheet 2
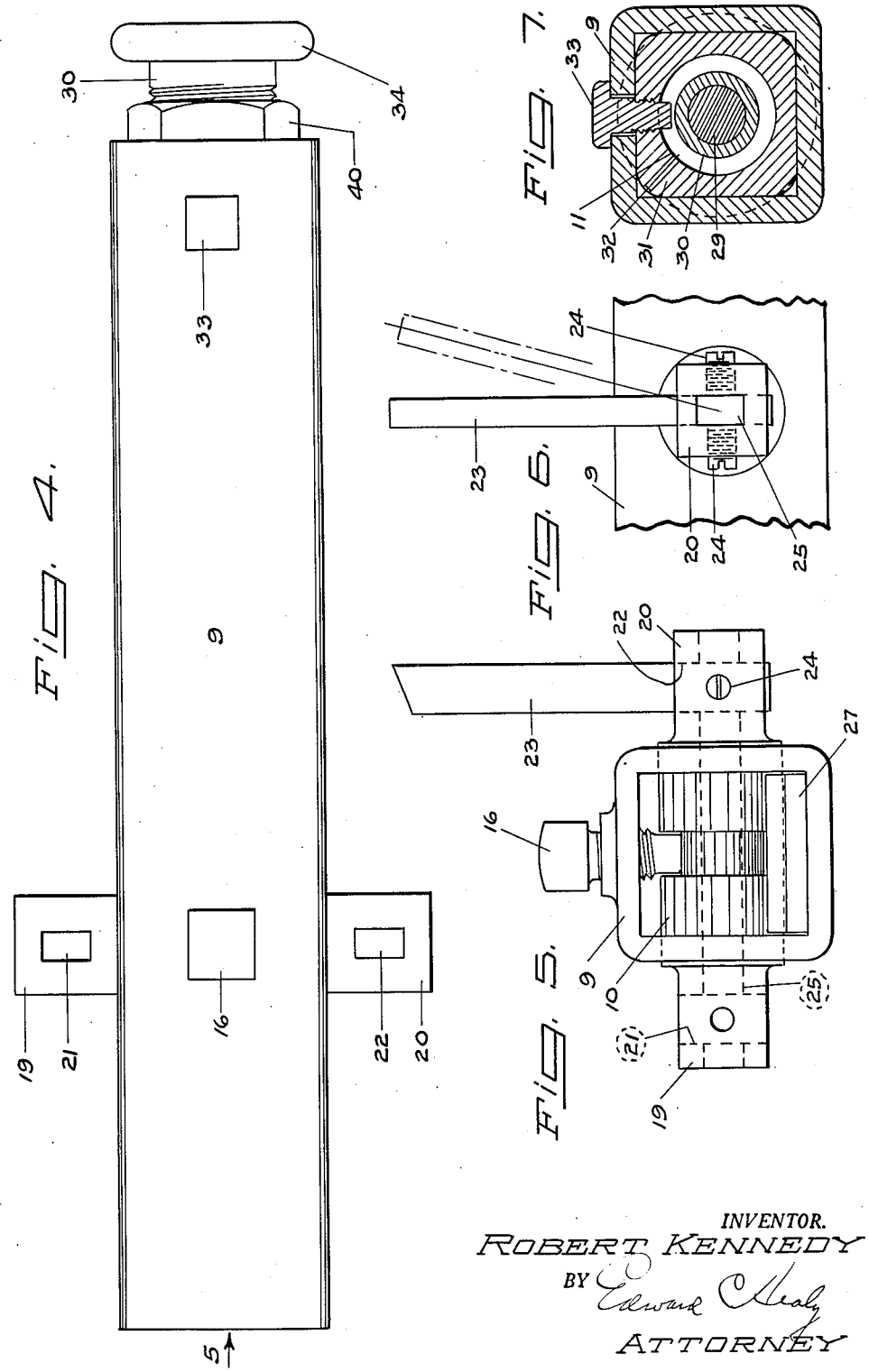
INVENTOR.
ROBERT KENNEDY
BY Edward C Healy
ATTORNEY Patented May 23, 1950

2,509,152

UNITED STATES PATENT OFFICE 2,509,152

TOOL AND CUTTER HOLDER

Robert Kennedy, San Francisco, Calif.

Application April 11, 1946, Serial No. 661,432

1 Claim. (Cl. 29—98)

This invention relates to a new and useful improved tool and cutter holder utilized in connection with lathes, gear cutting machines, milling machines and many other machines employed in shop practice.

The primary object of the present invention is to provide an especially constructed device for holding cutting tools in a new manner, whereby the tool can be adjusted and the cutting edge thereof reversed without the necessity of removing the tool from the device.

Another object of the present invention is to embody a gear in the construction of the device and to provide means on the gear for holding a cutting tool and to further provide a gear rack for controlling and adjusting said gear, whereby the tool is adjusted and the cutting edge thereof reversed.

A further object of the present invention is to provide an elongated threaded rod on one end portion of said rack and to longitudinally move the same by an internally threaded sleeve having a handle thereon, whereby the said gear is adjusted by turning the said hand handle of the sleeve.

A still further object of the invention is to provide the said gear with means for holding the cutting tools both longitudinally and transversely therein.

A still further object of the invention is the production of a tool and cutter holder that is simple in construction, economical to manufacture, positive in operation, and highly serviceable in use.

Other objects and advantages will be apparent during the course of the following description.

In the accompanying drawings forming a part of the specification and wherein for the purpose of illustration like numerals designate like parts throughout the same, Fig. 1 is a central longitudinal sectional view taken through the body of the device, illustrating the gear for holding the cutting tools and the adjusting mechanism;

Fig. 2 is a transverse sectional view taken on line 2—2 of Fig. 1, looking in direction of the arrows;

Fig. 3 is a fragmentary side elevational view of the device, looking at the end of the cutting tool;

Fig. 4 is a top plan view of the device;

Fig. 5 is an end elevational view of the device looking in direction of the arrow 5;

Fig. 6 is a fragmentary side elevational view of the device illustrating how the transversely held cutting tool can be adjusted; and Fig. 7 is a transverse sectional view taken on line 7—7 of Fig. 1, looking in direction of the arrows.

Referring in detail to the drawings wherein for the purpose of illustration is shown a preferred embodiment of my invention, the numeral 9 designates the body of the device that is preferably an elongated rectangular hollow form, but can have any other suitable shape, and the numeral 10 designates a pinion or small gear wheel that is transversely positioned into said body and extends through the circular openings 11 in the side walls 12 and 13 thereof as shown in Figs. 1, 2 and 5. The teeth 14 of said pinion do not extend through the ends of the same, whereby a smooth circular periphery 10' at each end portion of said pinion is formed and which are revolubly supported in said openings 11. A circular groove 15 is formed around the central portion of said pinion 10 and a substantial set screw 16 is threaded through the top wall of the body 9 and extends into said groove and serves to lock the pinion and also to prevent transverse movement thereof when the same is revolved. Oppositely opposed flat spots 17 and 18 are preferably formed on the inner surface of the groove 15 to assist the said set screw in preventing revolvable movement of the pinion when the same is locked. The flat spots are not provided when various adjustments are required.

The said pinion 10 is formed with extensions 19 and 20 that may be either round or rectangular and transverse slots 21 and 22 respectively are provided through said extensions to receive a cutting tool 23 which tool is secured by a pair of set screws 24. A longitudinal slot 25 is provided through the said pinion and the extensions thereon for receiving a cutting tool 26, which tool is secured by a plurality of set screws 24.

The preferred construction for adjusting the said pinion 10 and the cutting tool secured therein is shown as comprising a gear rack 27 and mounting the same into the rectangular housing 9 as shown in Fig. 1. The said rack is formed with a rectangular portion 28 with an elongated threaded rod 29 extending therefrom. The said rectangular portion 28 has a close sliding fit within the said housing and the threaded rod 29 is received into an elongated internally threaded sleeve 30, which sleeve is revolubly supported in a journal 31 that is fixed into the housing. A circular groove 32 is formed around the sleeve 30 and a set screw 33 extends into the said groove preventing longitudinal movement of the sleeve. A suitable handle 34 is provided on the outer end of the sleeve for enabling revolvable movement to be manually imparted thereto.

From the foregoing description taken in conjunction with the accompanying drawings it will be apparent that when the set screw 16 is unlocked against the pinion 10 and the said sleeve 30 is revolved clockwise the threaded rod 29 within said sleeve will move forward and push the rack 27 forward which will turn the pinion 10 and adjust the cutting tools therein. The distance between the outermost end 35 of the rack 27 and the inner face of the stop 36 is such that when the said end 35 abuts the said stop 36 the said pinion 10 is turned clockwise one-half turn reversing the cutting point 37 of the cutting tool 26. When the said sleeve 30 is revolved counter clockwise the rack will be retracted which will turn the said gear 10 counter clockwise to one-half turn when the inner face 38 of the rectangular block 28 abuts the outermost end 39 of the journal box 30. A lock nut 40 is provided for locking the sleeve 30 when necessary. It will be apparent that cutting points of the cutter illustrated in Fig. 2 can readily be reversed and that tools such as illustrated in Figs. 5 and 6 can be adjusted to any angle desired. The said device can be used with any type of machine and clamped thereon or secured in position in any manner which will serve the purpose of the invention.

It is to be understood that the form of the invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In combination with a metal cutting machine, a tool holder of the character described, comprising an elongated hollow body capable of being clamped to the machine, a pinion revolvably mounted within said body and positioned across the same, means in said pinion for retaining a cutting tool therein, a gear rack slidably mounted within the said elongated body and adapted to engage said pinion, means including a circumferential groove in said pinion and a set screw in said body for locking said pinion to said rack and body, and means including a stationary internally threaded sleeve and a movable externally threaded rod for imparting longitudinal movement to the rack for adjusting the pinion and cutting tool.

ROBERT KENNEDY.

REFERENCES CITED

The following references are of record in the file of this patent:

UNITED STATES PATENTS

| Number | Name | Date |
|---|---|---|
| 800,972 | Black | Oct. 3, 1905 |
| 1,415,578 | Knoop | May 9, 1922 |

FOREIGN PATENTS

| Number | Country | Date |
|---|---|---|
| 559,184 | Great Britain | Feb. 8, 1942 |